(12) United States Patent
Buchhammer et al.

(10) Patent No.: US 12,560,261 B2
(45) Date of Patent: Feb. 24, 2026

(54) CONNECTING FLANGE FOR CONNECTING TWO TUBULAR COMPONENTS TO EACH OTHER

(71) Applicant: Purem GmbH, Neunkirchen (DE)

(72) Inventors: Andrei Buchhammer, Ludwigsburg (DE); Lorenz Hermann, Schorndorf (DE); Remus Boriga, Wernau (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 18/812,555

(22) Filed: Aug. 22, 2024

(65) Prior Publication Data

US 2025/0067374 A1 Feb. 27, 2025

(30) Foreign Application Priority Data

Aug. 22, 2023 (DE) ...................... 10 2023 122 362.3

(51) Int. Cl.
| | |
|---|---|
| *F16L 23/08* | (2006.01) |
| *F01N 13/18* | (2010.01) |
| *F16L 23/04* | (2006.01) |

(52) U.S. Cl.
CPC .......... *F16L 23/08* (2013.01); *F01N 13/1827* (2013.01); *F16L 23/04* (2013.01)

(58) Field of Classification Search
CPC . F16L 27/04; F16L 27/06; F16L 23/08; F16L 23/04; F01N 13/1827
See application file for complete search history.

(56) References Cited

U.S. PATENT DOCUMENTS

| | | | | |
|---|---|---|---|---|
| 3,421,652 A | * | 1/1969 | Warman | .................. F16L 23/08 |
| 3,498,649 A | * | 3/1970 | Anton | ...................... F16L 23/04 |
| 3,820,831 A | * | 6/1974 | Swedelius | |
| 3,865,413 A | * | 2/1975 | Mizusawa | ............... F16L 23/08 |
| 4,186,932 A | | 2/1980 | Emhardt et al. | |
| 9,683,687 B2 | | 6/2017 | Arigaya et al. | |
| 9,909,698 B2 | * | 3/2018 | Drost | ...................... F16L 23/04 |
| 11,680,668 B2 | * | 6/2023 | Brohan | .................. F16L 27/04 |
| 2015/0198275 A1 | * | 7/2015 | Arigaya | ............. F01N 13/1827 |
| 2019/0010855 A1 | * | 1/2019 | Green | |
| 2021/0148275 A1 | * | 5/2021 | Hiraoka | .................. F16L 23/08 |

FOREIGN PATENT DOCUMENTS

| | | |
|---|---|---|
| DE | 27 33 556 A1 | 1/1979 |
| FR | 2867511 A1 | 9/2005 |

* cited by examiner

*Primary Examiner* — William S. Choi
(74) *Attorney, Agent, or Firm* — Walter Ottesen, P.A.

(57) ABSTRACT

A connecting flange for mutually connecting two tubular components including a flange body annularly surrounding a flange longitudinal axis with a first flange contact region and a second flange contact region, which is arranged in the direction of the flange longitudinal axis at a distance from the first flange contact region. At the first flange contact region, a first inner circumferential contact surface for contact of the flange body against an outer circumferential surface of one of the components to be connected to each other via the connecting flange is provided, and, at the second flange contact region, a second inner circumferential contact surface for contact of the flange body against the outer circumferential surface is provided. An insulating recess extending radially outward with respect to the first inner circumferential contact surface or/and the second inner circumferential contact surface and open radially inward is provided in the flange body.

19 Claims, 1 Drawing Sheet

CONNECTING FLANGE FOR CONNECTING TWO TUBULAR COMPONENTS TO EACH OTHER

CROSS-REFERENCE TO RELATED APPLICATIONS

This application claims priority of German patent application no. 10 2023 122 362.3, filed Aug. 22, 2023, the entire content of which is incorporated herein by reference.

TECHNICAL FIELD

The present disclosure relates to a connecting flange via which two tubular components can be fixedly and gas-tightly connected to each other, for example, in an exhaust system of an internal combustion engine.

BACKGROUND

For the fixed and gas-tight connection of tubular components in exhaust systems for internal combustion engines used, for example, in motor vehicles, it is known to provide substantially radially extending, annular connecting flanges with connecting surfaces to be oriented in the axial direction to each other on axial end regions of such tubular components, which end regions are to be positioned facing each other and are to be fixedly connected to each other. The connecting flanges of the two tubular components can be fixedly connected to each other, for example, via an annular sealing element, which is arranged between the connecting surfaces of the components, in the region of their connecting flanges via screw bolts penetrating the latter or by a connecting clip surrounding same on the outside.

SUMMARY

It is an object of the present disclosure to provide a connecting flange for connecting two tubular components, in particular of an exhaust system of an internal combustion engine, which ensures a reliable and gas-tight connection of the tubular components.

According to the disclosure, the object is achieved by a connecting flange for connecting two tubular components to each other, preferably in an exhaust system of an internal combustion engine. The connecting flange includes a flange body annularly surrounding a flange longitudinal axis with a first flange contact region and a second flange contact region, which is arranged in the direction of the flange longitudinal axis at a distance from the first flange contact region, wherein, at the first flange contact region, a first inner circumferential contact surface for contact of the flange body against an outer circumferential surface of one of the components to be connected to each other via the connecting flange is provided, and, at the second flange contact region, a second inner circumferential contact surface for contact of the flange body against the outer circumferential surface is provided, wherein an insulating recess extending radially outward with respect to the first inner circumferential contact surface or/and the second inner circumferential contact surface and open radially inward is provided in the flange body axially between the first inner circumferential contact surface and the second inner circumferential contact surface.

By providing the two flange contact regions which are arranged axially at a distance from each other, on the one hand a stable contact interaction of the connecting flange with one of the tubular components to be connected by the latter and thus a defined positioning of the connecting flange with respect to the tubular component is achieved. At the same time, there is the possibility of realizing a fixed connection of the connecting flange to the tubular component in the region of at least one of the flange contact regions. On the other hand, the insulating recess or the air contained therein or another thermally insulating material creates an insulating effect, by which the connecting flange is thermally relieved. This leads to the connecting flange constructed according to the disclosure being particularly readily suitable for use in a thermally heavily loaded region, for example, of an exhaust system of an internal combustion engine in the vicinity of the exhaust gas outlet of the internal combustion engine.

The contact interaction of the connecting flange with the tubular component surrounded by it can be further improved in that the first flange contact region is provided on a first axial end region of the flange body and the second flange contact region is provided on a second axial end region of the flange body, or/and in that the first inner circumferential contact surface and the second inner circumferential contact surface are cylinder surfaces, preferably circular cylinder surfaces having the same radius to each other. In particular, with such a configuration, the connecting flange constructed according to the disclosure is particularly suitable for use in connection with cylindrical, tubular components with a circular cross section.

For the connection of the two tubular components to be connected to each other, the flange body axially substantially between the first flange contact region and the second flange contact region can have a flange connecting region which projects radially outward with respect to the first flange contact region and the second flange contact region and has a connecting region vertex lying axially between the first flange contact region and the second flange contact region, wherein the flange body is at the largest radial distance from the flange longitudinal axis in the connecting region vertex.

To avoid sharp-edged regions, the flange body can be curved convexly with respect to the flange longitudinal axis in the connecting region vertex.

The flange body can have a first connecting surface extending from the connecting region vertex to the first flange contact region at, starting from the connecting region vertex, a decreasing radial distance from the flange longitudinal axis, and a second connecting surface extending from the connecting region vertex to the second flange contact region at, starting from the connecting region vertex, a decreasing radial distance from the flange longitudinal axis. These connecting surfaces can be used to provide a connecting interaction with the other of the two tubular components or a connecting member holding the two tubular components together.

In order to obtain a defined connecting interaction, which is simple to realize, in the region of the connecting region, it is proposed that the first connecting surface, starting from the connecting region vertex, is substantially conically tapered, or/and that the second connecting surface, starting from the connecting region vertex, is substantially conically tapered.

The gas-tight connection of the two tubular components can be supported in that a sealing element projecting over the first connecting surface is provided on the flange body axially substantially between the connecting region vertex and the first flange contact region.

A sealing element receiving recess which is open to the first connecting surface can be provided in the flange body such that a defined positioning of the sealing element on the flange body can be ensured. Furthermore, for a uniform sealing effect over the circumference, the sealing element can surround the flange longitudinal axis substantially annularly. If the sealing element is constructed with graphite material, it is particularly suitable for use in regions subject to heavy thermal and chemical loads.

In order to be able to provide the required volume for accommodating the sealing element on the flange body with the insulating effect nevertheless realized, it is proposed that the insulating recess in a region thereof overlapped axially by the sealing element has a smaller length of extent radially outward than in a region thereof not overlapped axially by the sealing element.

The disclosure further relates to a connecting assembly, preferably for an exhaust system of an internal combustion engine, including a first tubular component and at least one connecting flange, constructed according to the disclosure, lying with its first inner circumferential contact surface and its second inner circumferential contact surface on an outer circumferential surface of the first tubular component.

A stable holding together of the at least one connecting flange with the first tubular component can be achieved in that the at least one connecting flange is fixedly connected in the region of at least one flange contact region by the first flange contact region and second flange contact region to the first tubular component via material bonding, preferably welding.

In order to avoid mechanical stresses in the event of a different thermal expansion of the at least one connecting flange, on the one hand, and the first tubular component, on the other hand, it is proposed that the at least one connecting flange is fixedly connected to the first tubular component only in the region of one flange contact region of the first flange contact region and second flange contact region. In the other flange contact region, although the flange body is supported on the outer circumferential surface of the first tubular component, it is substantially freely movable with respect thereto.

In a particularly advantageous embodiment, it can be provided that the at least one connecting flange is fixedly connected in the region of the second flange contact region to the first tubular component. The first flange contact region, which is positioned closer to the sealing element, and therefore also that region in which the sealing element provided for interaction with another tubular component is positioned, are therefore axially movable with respect to the first tubular component.

Furthermore, the present disclosure relates to an exhaust system for an internal combustion engine, including a connecting assembly constructed according to the disclosure and at least one second tubular component connected via the at least one connecting flange to the first tubular component.

For the connection to the at least one connecting flange, the second tubular component can have a counter-connecting region with a counter-connecting surface for connecting interaction with a connecting surface of the first connecting surface and second connecting surface of the at least one connecting flange.

To support a defined positioning of the two tubular components to be connected to each other, it is proposed that the counter-connecting surface is formed expanding radially, preferably conically, in the direction of an axial end of the second tubular component. Thus, it can be achieved that the two tubular components are held in a position centered radially with respect to each other by conical connecting surfaces supported on each other.

The fixed holding together of the two tubular components can be achieved, for example, in that the first tubular component and the second tubular component are held together in a connecting state by a connecting member, preferably connecting clip, annularly surrounding the connecting region of the at least one connecting flange and the counter-connecting region of the second tubular component.

BRIEF DESCRIPTION OF DRAWINGS

The invention will now be described with reference to the drawings wherein.

DETAILED DESCRIPTION

Figure 1:
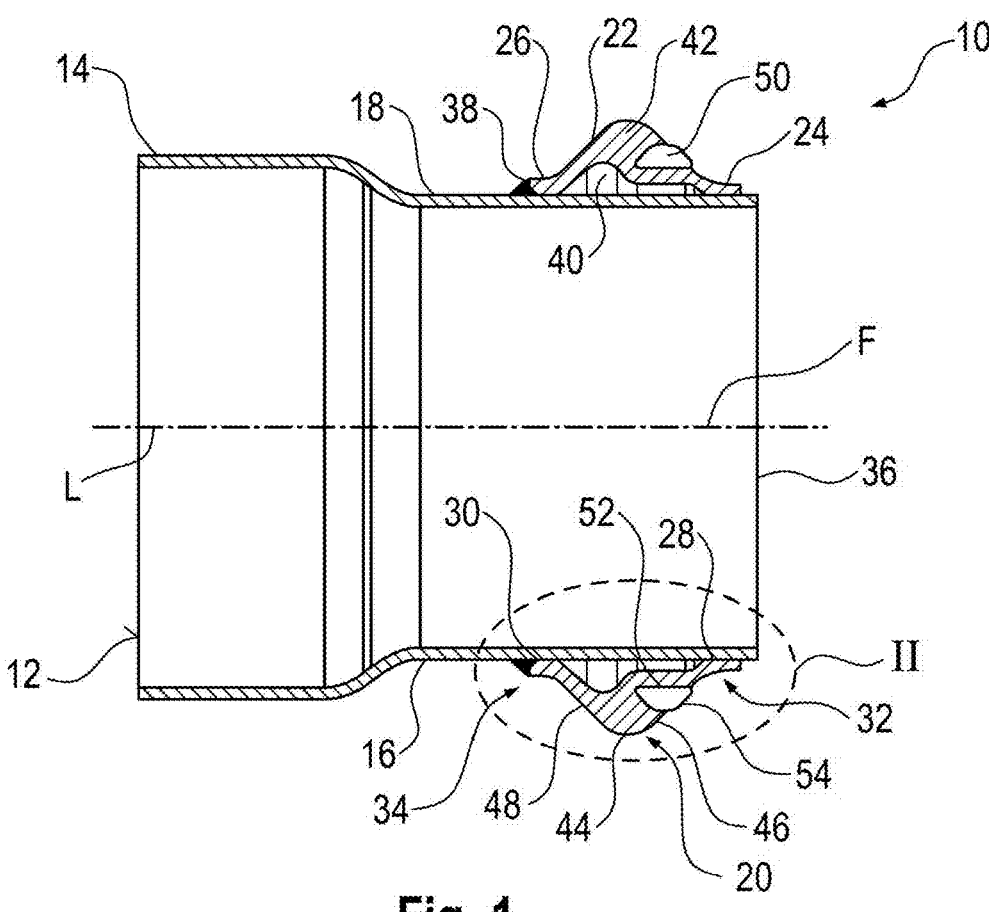
FIG. 1 shows a longitudinal sectional view of a connecting assembly with a tubular component and a connecting flange provided thereon; and, FIG. 2 shows a detailed view of the connecting assembly of FIG. 1 in region II in FIG. 1 in the case of a connecting assembly connected to another tubular component.

In FIG. 1, a connecting assembly which can be used in an exhaust system of an internal combustion engine is denoted in general by 10. The connecting assembly 10 includes a first tubular component 12 which, in the embodiment illustrated, has two substantially cylindrical regions 14, 16 with mutually different diameters with respect to a longitudinal axis L. In the region 16 with a smaller diameter, a connecting flange denoted in general by 20 is provided on an outer circumferential surface 18 of the first tubular component 12. The connecting flange 20 is arranged annularly surrounding the longitudinal axis L, which corresponds in the assembled state to a flange longitudinal axis F, of the first tubular component 12, that is, forms a closed ring surrounding the outer circumferential surface 18 in its entire circumferential region of extent about the longitudinal axis L.

The connecting flange 20 includes a flange body 22 constructed with metal material. On the flange body 22, a first flange contact region 24 and a second flange contact region 26 are formed at an axial distance from each other. In the first flange contact region 24, the flange body 22 provides a first inner circumferential contact surface 28, with which the flange body 22 lies on the outer circumferential surface 18 of the first tubular component 12. In the second flange contact region 26, the flange body 22 provides a second inner circumferential contact surface 30, with which the flange body 22 also lies on the outer circumferential surface 18 of the first tubular component 12.

For adaptation to the shape of the first tubular component 12, in particular in the region 16 thereof provided for receiving the connecting flange 20, the first inner circumferential contact surface 28 and the second inner circumferential contact surface 30 are configured as cylinder surfaces which, adapted to the, for example, circular cross-sectional geometry of the first tubular component 12, in particular in the region 16 thereof, can likewise have a circular cross-sectional geometry, that is, can be configured as circular cylinder surfaces. This ensures that, in both flange contact regions 24, 26, a stable, flat contact between the flange body 22 and the first tubular component 12 is produced at a first axial end region 32 of the flange body 22 having the first flange contact region 24 and at a second axial end region 34 of the flange body 22 having the second flange contact region 26.

A fixed connection of the flange body 22 to the first tubular component 12 takes place only in the region of the second flange contact region 26 and second axial end region 34 lying further away from an axial end 36 of the first tubular component 12. For this purpose, a welded joint 38 which runs through in the circumferential direction about the longitudinal axis L, preferably without interruption, can be produced. In the region of the first flange contact region 24 and the first axial end region 32, the flange body 22, which is also supported there on the outer circumferential surface 18 of the first tubular component 12, is therefore in principle substantially freely movable or displaceable axially with respect to the first tubular component 12.

An insulating recess 40 is formed in the flange body 22 axially between the two flange contact regions 24, 26 and the two axial end regions 32, 34 of the flange body 22. The insulating recess 40 extends radially outward, starting from the radial level of the two inner circumferential contact surfaces 28, 30 which are at the same radial distance from the flange longitudinal axis F, and is in principle open radially inward or, in the case of the connecting flange 20 attached to the first tubular component 12, is covered radially inward by that portion of the outer circumferential surface 18 of the first tubular component 12 which lies between the two axial end regions 32, 34 of the flange body 22.

In the assembled state, air or optionally another insulating material, such as foamed insulating material or the like, is present in the insulating recess 40, as a result of which thermal insulation of the flange body 22, in particular in the region of a flange connecting region 42 lying between the two flange contact regions 24, 26, is realized. With this flange connecting region 42, the flange body 22 extends further radially outward between the two flange contact regions 24, 26. In a connecting region vertex 44, the flange connecting region 42 and the flange body 22 are at the greatest radial distance from the flange longitudinal axis F.

Following the first flange contact region 24, the flange connecting region 42, starting from the connecting region vertex 44 in the direction of the first flange contact region 24, provides a preferably substantially conically tapering first connecting surface 46. Similarly, the flange connecting region 42 between the connecting region vertex 44 and the second flange contact region 26, starting from the connecting region vertex 44 in the direction of the second flange contact region 26, provides a preferably substantially conically tapering second connecting surface 48. In order to avoid a sharp-edged transition between the two connecting surfaces 46, 48 running in a substantially V-shaped manner toward each other, the flange connecting region 42 in the region of the connecting region vertex 44 is curved convexly with respect to the flange longitudinal axis F.

A sealing element 50 which is constructed, for example, with graphite material and surrounds the flange longitudinal axis L, preferably as a closed ring, is arranged in a region of the flange body 22 or of the flange connecting region 42 lying between the connecting region vertex 44 and the first flange contact region 24. The sealing element is accommodated in a sealing element receiving recess 52 open to the first connecting surface 46 and held therein, for example, by a press fit. The sealing element 50 protrudes with a sealing surface region 54 thereof over the first connecting surface 46 in order to be able to deploy a sealing interaction with a second tubular component 56, which can be seen in FIG. 2.

In order to be able to provide the volume required in the flange body 22 for accommodating the sealing element 50, without having to provide the flange body 22 with excessively large dimensions, the insulating recess 40, in that region in which it is overlapped axially by the sealing element 50 or by the sealing element receiving recess 52, is formed with a smaller radial length of extent than in the axially following region, in which the insulating recess 40 is not overlapped axially by the sealing element 50 or by the sealing element receiving recess 52. In this region, a radial overlap between the insulating recess 40 and the sealing element 50 or the sealing element receiving recess 52 may be present.

Figure 2:
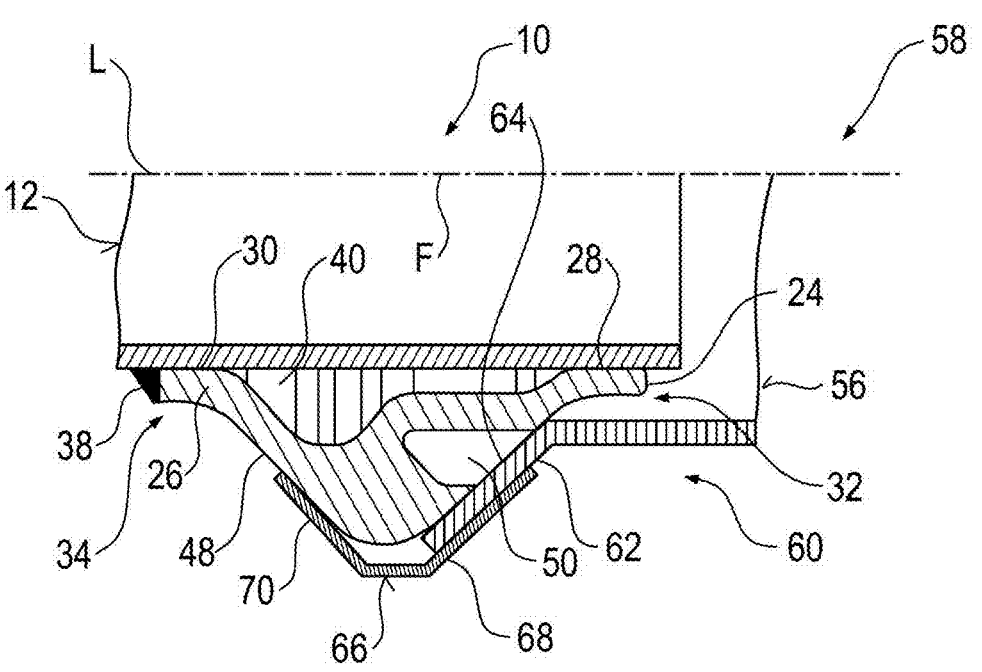

FIG. 2 illustrates how the two tubular components 12 and 56 of an exhaust system denoted in general by 58 are gas-tightly connected to each other using the connecting flange 20. The second tubular component 56, in its axial end region 60 to be connected gas-tightly to the first tubular component 12, has a counter-connecting region 62, which is produced, for example, by radial expansion, with a counter-connecting surface 64. In adaptation to the shaping of the first connecting surface 46 of the connecting flange 20, the counter-connecting surface 64 may also have a basically conical shape.

In the connection state, the second tubular component 56 lies with the counter-connecting surface 64, with compression of the sealing element 50, against the connecting flange 20 or the first connecting surface 46. The fixed holding together of the two tubular components 12, 56 is achieved in this state by a connecting member 66 annularly surrounding the connecting flange 20 or also the counter-connecting region 62 radially on the outside. The connecting member is constructed, for example, as a connecting clip or pipe clip, which lies with respective limb regions 68, 70 against counter-connecting region 62 or against the second connecting surface 48 of the connecting flange 20 and, by circumferential bracing of same, clamps the counter-connecting region 62 axially against the connecting region 42 of the connecting flange Since, on the one hand, the connecting flange 20, in particular in its flange connecting region 42, is readily thermally insulated in relation to that portion of the first tubular component 12 extending in this region by the provision of the insulating recess 40 and since, on the other hand, the first flange contact region 24 and that portion of the flange connecting region 42 which lies close thereto and in which the first connecting surface 46 is also provided is in principle substantially freely movable axially with respect to the first tubular component 12, a comparatively strong heating of the connecting flange 20 taking place via the second tubular component 56 cannot lead to an excessive load on the connecting flange 20 or the fixed connection thereof to the first tubular component 12. If, during operation, a different degree of thermal change in length occurs between the connecting flange 20 and the first tubular component 12, the connecting flange 20 with its first flange contact region 24 can shift axially with respect to the first tubular component 12. Owing to this property, the connecting flange 20 constructed according to the disclosure is particularly suitable for use in a region of this type of the exhaust system 58, in which a strong thermal load by the exhaust gas emitted by an internal combustion engine is produced via the second tubular component 56 positioned comparatively close to the internal combustion engine. Nevertheless, the connecting flange 20 may also be used in other or less strongly thermally loaded regions of an exhaust system.

It is understood that the foregoing description is that of the preferred embodiments of the invention and that various changes and modifications may be made thereto without departing from the spirit and scope of the invention as defined in the appended claims.

The invention claimed is:

1. A connecting flange for connecting two tubular components to each other, the connecting flange defining a flange longitudinal axis and comprising:

a flange body annularly surrounding said flange longitudinal axis;

said flange body having a first flange contact region and a second flange contact region arranged along said flange longitudinal axis with said second flange contact region being at a distance from said first flange contact region;

at said first flange contact region, a first inner circumferential contact surface being provided for contact of said flange body against an outer circumferential surface of one of said tubular components to be connected to each other via said connecting flange;

at said second flange contact region, a second inner circumferential contact surface being provided for contact of said flange body against said outer circumferential surface;

wherein an insulating recess is provided in said flange body axially between said first inner circumferential contact surface and said second inner circumferential contact surface;

wherein said insulating recess opens radially inward in the flange body and at least one of the following applies:

i) said insulating recess extends radially outwardly with respect to said first inner circumferential contact surface;

ii) said insulating recess extends radially outward with respect to said second inner circumferential contact surface;

wherein:

said flange body has a flange connecting region disposed axially between said first flange contact region and said second flange contact region, said flange connecting region projecting radially outwardly with respect to said first flange contact region and said second flange contact region and having a connecting region vertex lying axially between said first flange contact region and said second flange contact region, said flange body being at a largest radial distance from said flange longitudinal axis in said connecting region vertex;

said flange body has a first connecting surface extending from said connecting region vertex to said first flange contact region at, starting from said connecting region vertex, a decreasing radial distance from said flange longitudinal axis, and has a second connecting surface extending from said connecting region vertex to said second flange contact region at, starting from said connecting region vertex, a decreasing radial distance from said flange longitudinal axis;

said flange body defines a sealing element receiving recess open to said first connecting surface; and a sealing element received in said sealing element receiving recess and projecting over said first connecting surface is provided on said flange body axially between said connecting region vertex and said first flange contact region.

2. The connecting flange of claim 1, wherein at least one of the following applies:

i) said flange body has first and second axial end regions; and, said first flange contact region is provided on said first axial end region and said second flange contact region is provided on said second axial end region; and, ii) said first inner circumferential contact surface and said second inner circumferential contact surface are cylindrical surfaces.

3. The connecting flange of claim 2, wherein said cylindrical surfaces have a same radius to each other.

4. The connecting flange of claim 1, wherein said flange body is curved convexly with respect to said flange longitudinal axis in said connecting region vertex.

5. The connecting flange of claim 1, wherein at least one of the following applies:

i) said first connecting surface, starting from said connecting region vertex, is conically tapered; and, ii) said second connecting surface, starting from said connecting region vertex, is conically tapered.

6. The connecting flange of claim 1, wherein at least one of the following applies:

i) said sealing element surrounds said flange longitudinal axis annularly; and, ii) said sealing element is made with graphite material.

7. The connecting flange of claim 1, wherein said insulating recess in a region thereof overlapped axially by said sealing element has a smaller length of extent radially outward than in a region thereof not overlapped axially by said sealing element.

8. A connector assembly comprising:

a first tubular component;

a connecting flange defining a flange longitudinal axis and including:

a flange body annularly surrounding said flange longitudinal axis;

said flange body having a first flange contact region and a second flange contact region arranged along said flange longitudinal axis with said second flange contact region being at a distance from the first flange contact region;

at said first flange contact region, a first inner circumferential contact surface being provided for contact of said flange body against an outer circumferential surface of one of said tubular components to be connected to each other via said connecting flange;

at said second flange contact region, a second inner circumferential contact surface being provided for contact of said flange body against the outer circumferential surface;

wherein an insulating recess is provided in said flange body axially between said first inner circumferential contact surface and said second inner circumferential contact surface;

wherein said insulating recess opens radially inward in the flange body and at least one of the following applies:

i) said insulating recess extends radially outwardly with respect to said first inner circumferential contact surface;

ii) said insulating recess extends radially outward with respect to said second inner circumferential contact surface;

said connecting flange lying with said first inner circumferential contact surface and said second inner circumferential contact surface on the outer circumferential surface of said first tubular component;

wherein:

said flange body has a flange connecting region disposed axially between said first flange contact region and said second flange contact region, said flange connecting region projecting radially outwardly with respect to said first flange contact region and said second flange contact region and having a connecting region vertex lying axially between said first flange contact region and said second flange contact region, said flange body being at a largest radial distance from said flange longitudinal axis in said connecting region vertex;

said flange body has a first connecting surface extending from said connecting region vertex to said first flange contact region at, starting from said connecting region vertex, a decreasing radial distance from said flange longitudinal axis, and has a second connecting surface extending from said connecting region vertex to said second flange contact region at, starting from said connecting region vertex, a decreasing radial distance from said flange longitudinal axis;

said flange body defines a sealing element receiving recess open to said first connecting surface; and a sealing element received in said sealing element receiving recess and projecting over said first connecting surface is provided on said flange body axially between said connecting region vertex and said first flange contact region.

9. The connecting assembly of claim 8, wherein said connecting assembly is for an exhaust system of an internal combustion engine.

10. The connecting assembly of claim 8, wherein at least one of the following applies:

i) said connecting flange is fixedly connected by said first flange contact region to said first tubular component via material bonding and ii) said connecting flange is fixedly connected by said second flange contact region to said first tubular component via material bonding.

11. The connecting assembly of claim 10, wherein said material bonding is defined by a weld.

12. The connecting assembly of claim 8, wherein said connecting flange is fixedly connected to said first tubular component only in one of said first flange contact region and said second flange contact region.

13. The connecting assembly of claim 12, wherein said connecting flange is fixedly connected in the region of said second flange contact region to said first tubular component.

14. An exhaust system for an internal combustion engine, the exhaust system comprising:

a connecting assembly including:

a first tubular component;

a connecting flange defining a flange longitudinal axis and including:

a flange body annularly surrounding said flange longitudinal axis;

said flange body having a first flange contact region and a second flange contact region arranged along said flange longitudinal axis with said second flange contact region being at a distance from the first flange contact region;

at said first flange contact region, a first inner circumferential contact surface being provided for contact of said flange body against an outer circumferential surface of one of said tubular components to be connected to each other via said connecting flange;

at said second flange contact region, a second inner circumferential contact surface being provided for contact of said flange body against the outer circumferential surface;

wherein an insulating recess is provided in said flange body axially between said first inner circumferential contact surface and said second inner circumferential contact surface;

wherein said insulating recess opens radially inward in the flange body and at least one of the following applies:

i) said insulating recess extends radially outwardly with respect to said first inner circumferential contact surface;

ii) said insulating recess extends radially outward with respect to said second inner circumferential contact surface;

said connecting flange lying with said first inner circumferential contact surface and said second inner circumferential contact surface on the outer circumferential surface of said first tubular component;

a second tubular component connected via said connecting flange to said first tubular component;

wherein:

said flange body has a flange connecting region disposed axially between said first flange contact region and said second flange contact region, said flange connecting region projecting radially outwardly with respect to said first flange contact region and said second flange contact region and having a connecting region vertex lying axially between said first flange contact region and said second flange contact region, said flange body being at a largest radial distance from said flange longitudinal axis in said connecting region vertex;

said flange body has a first connecting surface extending from said connecting region vertex to said first flange contact region at, starting from said connecting region vertex, a decreasing radial distance from said flange longitudinal axis, and has a second connecting surface extending from said connecting region vertex to said second flange contact region at, starting from said connecting region vertex, a decreasing radial distance from said flange longitudinal axis;

said flange body defines a sealing element receiving recess open to said first connecting surface; and a sealing element received in said sealing element receiving recess and projecting over said first connecting surface is provided on said flange body axially between said connecting region vertex and said first flange contact region.

15. The exhaust system of claim 14, wherein:

said second tubular component has a counter-connecting region with a counter-connecting surface for connecting interaction with said first connecting surface.

16. The exhaust system of claim 15, wherein said counter-connecting surface is formed expanding radially in a direction of an axial end of said second tubular component.

17. The exhaust system of claim 15, wherein said first tubular component and said second tubular component are held together in a connection state by a connecting member annularly surrounding said flange connecting region and said counter-connecting region of said second tubular component.

18. The exhaust system of claim 17, wherein said first tubular component and said second tubular component are held together in said connection state by said connecting member in such a manner that the counter-connecting surface of the counter-connecting region of the second tubular component, with compression of the sealing element, lies against the first connecting surface.

19. The exhaust system of claim 17, wherein said connecting member is constructed as a connecting clip having two limb regions, one of the limb regions lying against the counter-connecting region of the second tubular component and the other one of the limb regions lying against the second connecting surface.

\* \* \* \* \*